United States Patent
Katayama et al.

[19]

[11] Patent Number: 6,141,036
[45] Date of Patent: *Oct. 31, 2000

[54] IMAGE RECORDING AND REPRODUCING APPARATUS

[75] Inventors: Tatsushi Katayama, Tokyo; Nobuo Fukushima, Yokohama; Masayoshi Sekine, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/972,331

[22] Filed: Nov. 18, 1997

Related U.S. Application Data

[63] Continuation of application No. 08/426,175, Apr. 21, 1995, abandoned.

[30] Foreign Application Priority Data

Apr. 28, 1994 [JP] Japan ................................. 6-114157

[51] Int. Cl.$^7$ ................................................. H04N 13/02
[52] U.S. Cl. ............................ 348/47; 348/38; 348/218; 386/95
[58] Field of Search ........................... 348/36–39, 42–60, 348/61, 218, 445; 386/46, 36, 95; 360/18; H04N 13/02

[56] References Cited

U.S. PATENT DOCUMENTS

| | | | |
|---|---|---|---|
| 2,782,700 | 2/1957 | Ianuzzi | 348/48 |
| 4,853,764 | 8/1989 | Sutter | 348/53 |
| 5,218,452 | 6/1993 | Kondo et al. | 358/342 |
| 5,359,422 | 10/1994 | Fukushima | 358/296 |
| 5,574,567 | 11/1996 | Cookson et al. | 386/46 |

*Primary Examiner*—Howard Britton
*Attorney, Agent, or Firm*—Fitzpatrick, Cella, Harper & Scinto

[57] ABSTRACT

An image recording and reproducing apparatus includes a recording processing unit for receiving video signals in at least two different modes, and for recording the received video signals together with mode signals indicating the mode of the video signals. A signal reading unit reads a video signal and the corresponding mode signal recorded by the recording processing unit, and a detecting unit detects the mode of the video signal from the mode signal read by the signal reading unit. A generation unit generates a signal based on the video signal in accordance with the detected mode of the video signal such that the generated signal has a format that corresponds to the mode of the video signal.

7 Claims, 14 Drawing Sheets

FIELD ↕

IMAGE RECORDING AND REPRODUCING APPARATUS

This application is a continuation of application Ser. No. 08/426,175, filed Apr. 21, 1995, now abandoned.

BACKGROUND OF THE INVENTION

1. Field of the Invention

The present invention relates to an image recording and reproducing apparatus having the capability of recording and reproducing image signals in different formats.

2. Description of the Related Art

One known technique for recording and reproducing video signals supplied by a plurality of image pickup systems is a stereoscopic image recording/reproducing system. In such a system, during a recording operation, video signals supplied from a plurality of image pickup systems (right and left image pickup systems) are switched in such a manner that right and left images are alternately recorded for each field, and, during a reproducing operation, right and left images are reproduced in a time-division fashion using a liquid crystal shutter or a similar technique, thereby reproducing a stereoscopic image. In another known technique, video signals supplied from a plurality of image pickup systems are recorded using separate recording systems while maintaining synchronization. The video signals are reproduced in a polarized fashion while maintaining synchronization among the video signals. Users can view a stereoscopic image through polarization spectacles.

However, these techniques are only for recording and reproducing a stereoscopic image, and they do not have the capability of, for example, recording and reproducing video signals provided by a multifunction image pickup system. For example, conventional techniques do not have the capability of taking a picture through a plurality of imaging optical systems in such a manner that the view field of each imaging system has a partially-overlapped region so that an image with a modified aspect ratio or a panoramic image can be reproduced.

Multifunction image pickup systems provide output signals in various formats such as a panoramic video signal, a modified aspect ratio video signal, a high definition video signal, a stereoscopic video signal, etc., which can be switched as required. To handle video signals provided by the multifunction image pickup system, an image recording and reproducing apparatus must have the capability of recording a mixture of video signals in various formats, and the capability of, during a reproducing operation, providing an output signal in a suitable format depending on the type of video signal to be reproduced and also depending on the type of output apparatus used.

SUMMARY OF THE INVENTION

It is an object of the present invention to solve the above problem. More specifically, it is an object of the present invention to provide an image recording and reproducing apparatus having the capability of recording in various formats video signals supplied by an image pickup apparatus having a plurality of imaging optical systems and also having the capability of, during a reproducing operation, providing an output signal in a suitable format depending on the type of the recorded video signal and also depending on the type of output apparatus used.

The above objects are achieved by the present invention having various aspects as described below.

According to one aspect of the present invention, there is provided an image recording and reproducing apparatus, comprising: recording processing means for receiving video signals in at least two different modes, and for recording the received video signals together with mode signals indicating the mode of the video signals; signal reading means for reading a video signal and the corresponding mode signal recorded by the recording processing means; detecting means for detecting the mode of the video signal from the mode signal read by the signal reading means; and generation means for generating a signal based on the video signal in accordance with the detected mode of the video signal such that the generated signal has a format that corresponds to the mode of the above-described video signal.

According to another aspect of the invention, there is provided an image recording and reproducing apparatus, further including notifying means for showing the detected mode of a video signal.

According to still another aspect of the invention, there is provided an image recording and reproducing apparatus, further including conversion means for converting a video signal read by the signal reading means into a video signal in another mode, and outputting the resultant video signal.

When video signals in at least two different modes are input to the recording processing means, a signal indicating the mode of each video signal is added to each video signal, and the video signals are recorded together with the mode signals. During a reproducing operation, the signal reading means reads the recorded signals. The detecting means detects the mode of the video signal. The generation means generates a signal in a format that corresponds to the detected mode of the video signal and also corresponds to the type of an output device, wherein the information about the type of the output device is input via an input means. In a preferred embodiment of the invention, when the recorded signal is read and output, the mode of the recorded video signal is detected and indicated. In still another preferred embodiment of the invention, when the above-described recorded signal is read and output, the signal is output after video signal is converted into another mode.

According to another aspect of the present invention, an image pickup apparatus is provided that comprises a plurality of image pickup means for picking up respective image, image pickup mode control means for controlling an image pickup mode, having at least two modes selected from a group including a mode in which a stereoscopic image is picked up via a plurality of image pickup means, a mode in which a panoramic image is picked up, a mode in which an image having a modified aspect ratio is picked up, and a mode in which a high definition image is picked up, and selection means for selecting one of the modes associated with the image pickup mode control means.

According to yet another aspect of the present invention, a method of reproducing information from a recording medium storing a video signal and a mode signal indicating the mode in which the video signal was generated is provided. The method comprises the steps of reading the video signal and the mode signal from the recording medium, detecting the mode of the video signal from the mode signal and generating an output signal based on the video signal in accordance with the detected mode, so that the output signal has a format corresponding to the mode of the video signal.

According to yet another aspect of the present invention, a method of processing an image is provided. The method comprises the steps of selecting an image pickup mode from a group of image pickup modes including at least two of: a mode in which a stereoscopic image is picked up, a mode in which a panoramic image is picked up, a mode in which an image having a modified aspect ratio is picked up, and a mode in which a high definition image is picked up, and controlling a plurality of image pickup units to operate in accordance with the selected image pickup mode to produce an image signal.

BRIEF DESCRIPTION OF THE DRAWINGS

FIGS. 5(a)–(d) are schematic representations of signals recorded by the image recording and reproducing apparatus according to the first embodiment of the present invention;

DESCRIPTION OF THE PREFERRED EMBODIMENTS

Referring to the accompanying drawings, preferred embodiments of the present invention are described below.

Figure 1:
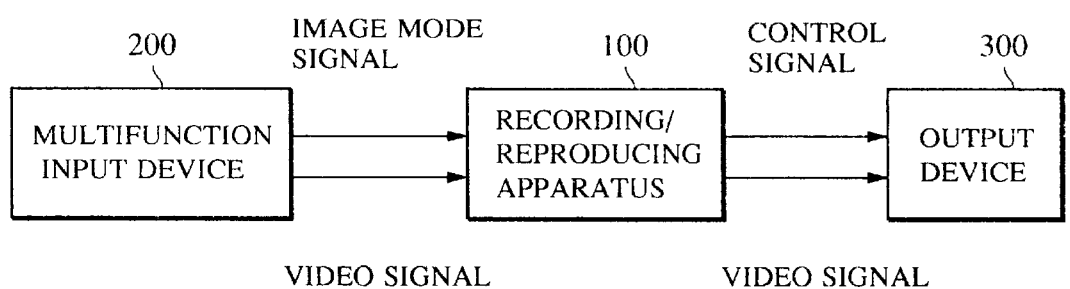
FIG. 1 is a block diagram illustrating a recording and reproducing system including an image recording and reproducing apparatus according to a first embodiment of the present invention.

FIG. 1 is a block diagram illustrating an example of a recording and reproducing system including an image recording and reproducing apparatus according to a first embodiment of the present invention. The recording and reproducing system includes a recording and reproducing apparatus 100, a multifunction input device 200, and an output device 300.

The multifunction input device 200 acquires an image and outputs a video signal associated with the acquired image to the recording and reproducing apparatus 100. In addition to the video signal, an image mode signal indicating the image acquisition mode associated with the video signal is also output to the recording and reproducing apparatus 100. The image acquisition modes include, for example, a stereoscopic image mode, a modified aspect ratio image mode, a panoramic image mode, a high definition image mode, etc. The recording and reproducing apparatus 100 records the image mode signal together with the video signal. During a reproducing operation, the recording and reproducing apparatus 100 reads the recorded video signal as well as the associated image mode signal, and generates a video signal in a format that matches the type of output device 300 to which the generated video signal is supplied. The output device 300 may be, for example, a device having a liquid crystal shutter, an HMD (human mounted display), etc. In addition to the video signal, a control signal is also supplied to the output device 300. For example, in the case where a stereoscopic image is displayed via a liquid crystal shutter, a control signal required to drive the liquid crystal is also supplied.

Figure 2:
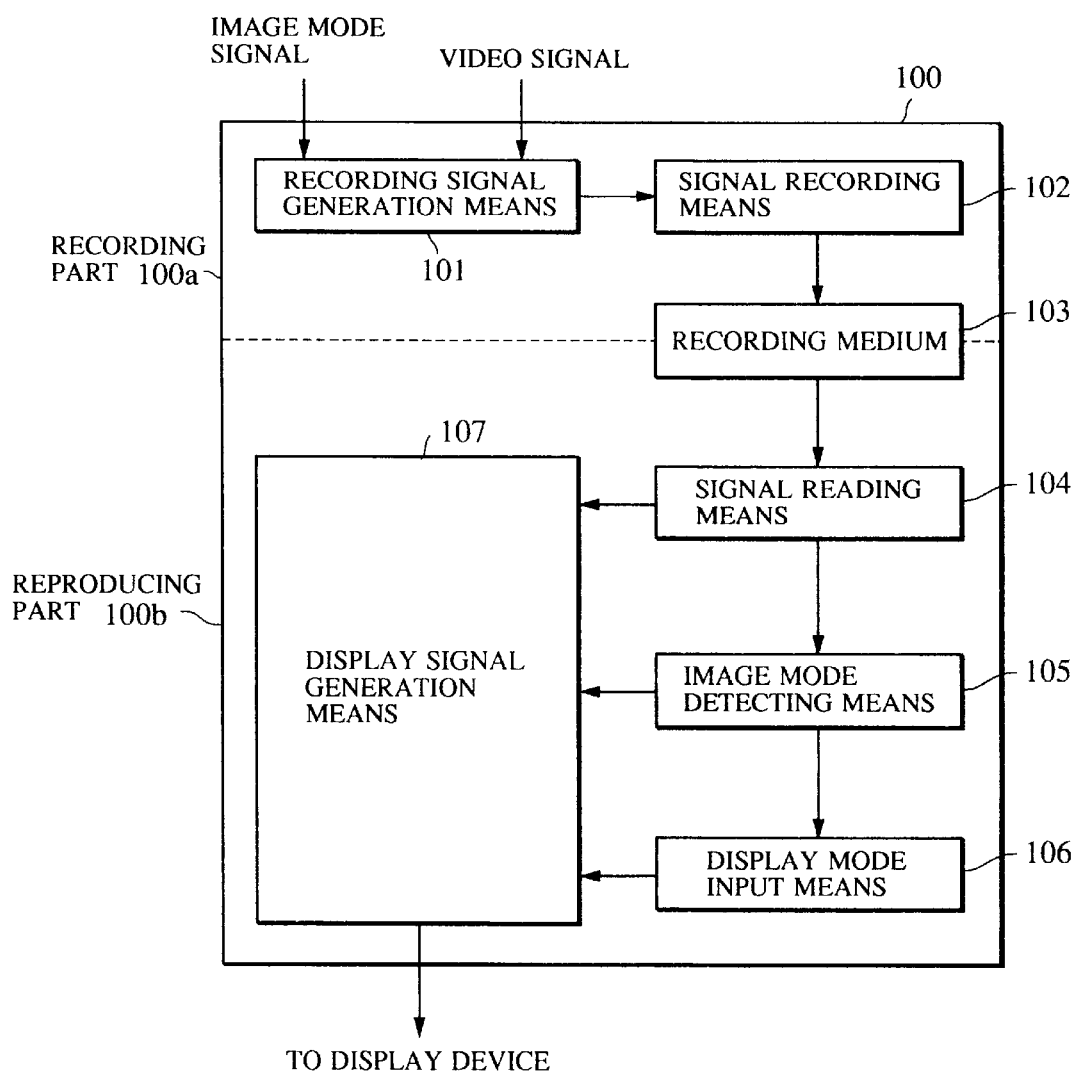
FIG. 2 is a block diagram illustrating the general configuration of an image recording and reproducing apparatus according to a first embodiment of the present invention.

Referring to FIG. 2, the basic configuration of the recording and reproducing apparatus 100 is next described. FIG. 2 is a block diagram illustrating the general configuration of the recording and reproducing apparatus 100. The recording and reproducing apparatus 100 is divided into a recording part 100a and a reproducing part 100b. The recording part 100a includes recording signal generation means 101 and signal recording means 102 connected to the recording signal generation means 101.

The recording signal generation means 101 generates a recording signal in accordance with a video signal and an associated image mode signal received from the multifunction input device 200. The generated recording signal is input to the signal recording means 102. The signal recording means 102 records the received signal on a recording medium 103. Examples of the recording medium 103 include, but are not limited to, a magnetic tape, a disk, and a memory device.

The reproducing part 100b comprises signal reading means 104, image mode detecting means 105, display mode input means 106, and display signal generation means 107. The signal reading means 104 reads a signal recorded on the recording medium 103, and outputs a video signal to the display signal generation means 107, and also outputs an image mode signal to the image mode detecting means 105. The image mode detecting means 105 detects an image mode from the received image mode signal and supplies the detected signal to the display mode input means 106 and the display signal generation means 107.

Figure 3A:
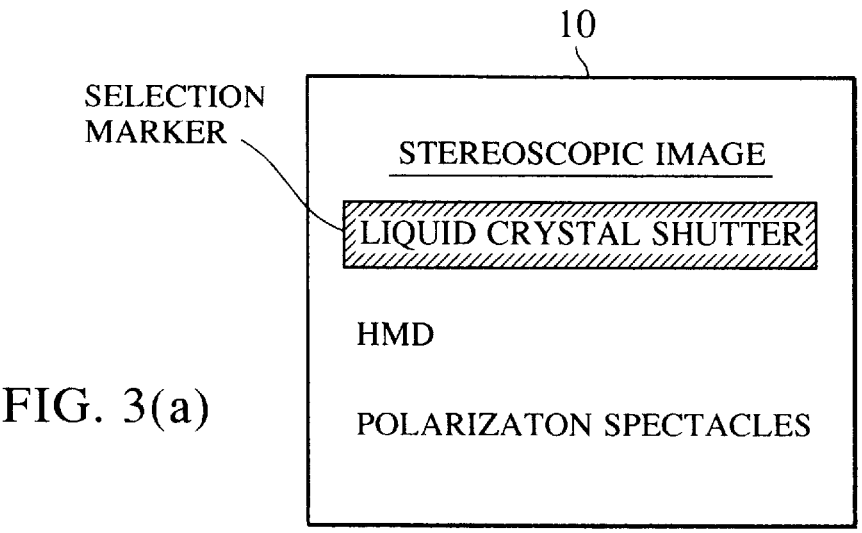
FIGS. 3(a)–(c) illustrate some examples of the contents displayed on a display panel of the apparatus shown in FIG. 2.
Figure 3B:
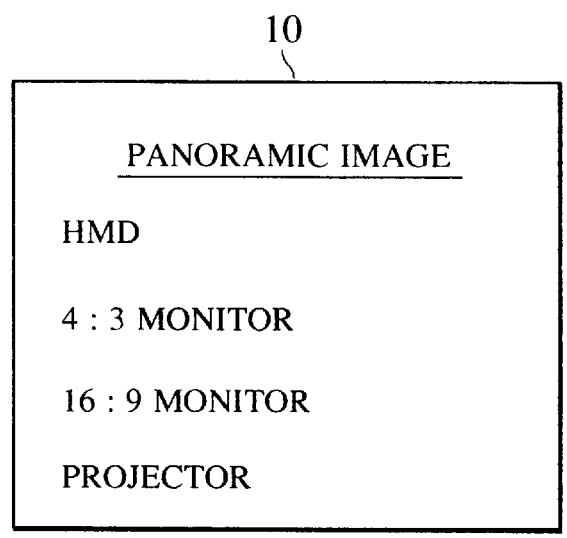
Figure 3C:
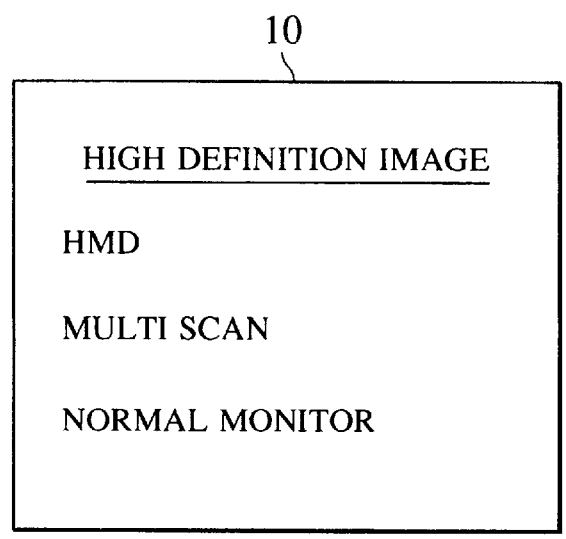

The display mode input means 106 displays, on a display panel 10, a selection menu corresponding to the image mode detection signal received from the image mode detecting means 105, as shown in FIGS. 3a, 3b, and 3c. FIG. 3a illustrates an example of the contents displayed on the display panel 10 for the case where a stereoscopic image mode has been detected. In the example shown in FIG. 3b, a panoramic image mode has been detected. In the case of FIG. 3c, a high definition image mode has been detected. A user selects a type of the output device 300 from the menu displayed on the display mode input means 106.

The display signal generation means 107 generates a signal suitable for the output device 300 from the video signal and image mode detection signal received from the signal reading means 104 as well as the signal indicating the type of the output device 300 selected via the display mode input means 106. The generated signal also includes a control signal required in a display operation.

Figure 4:
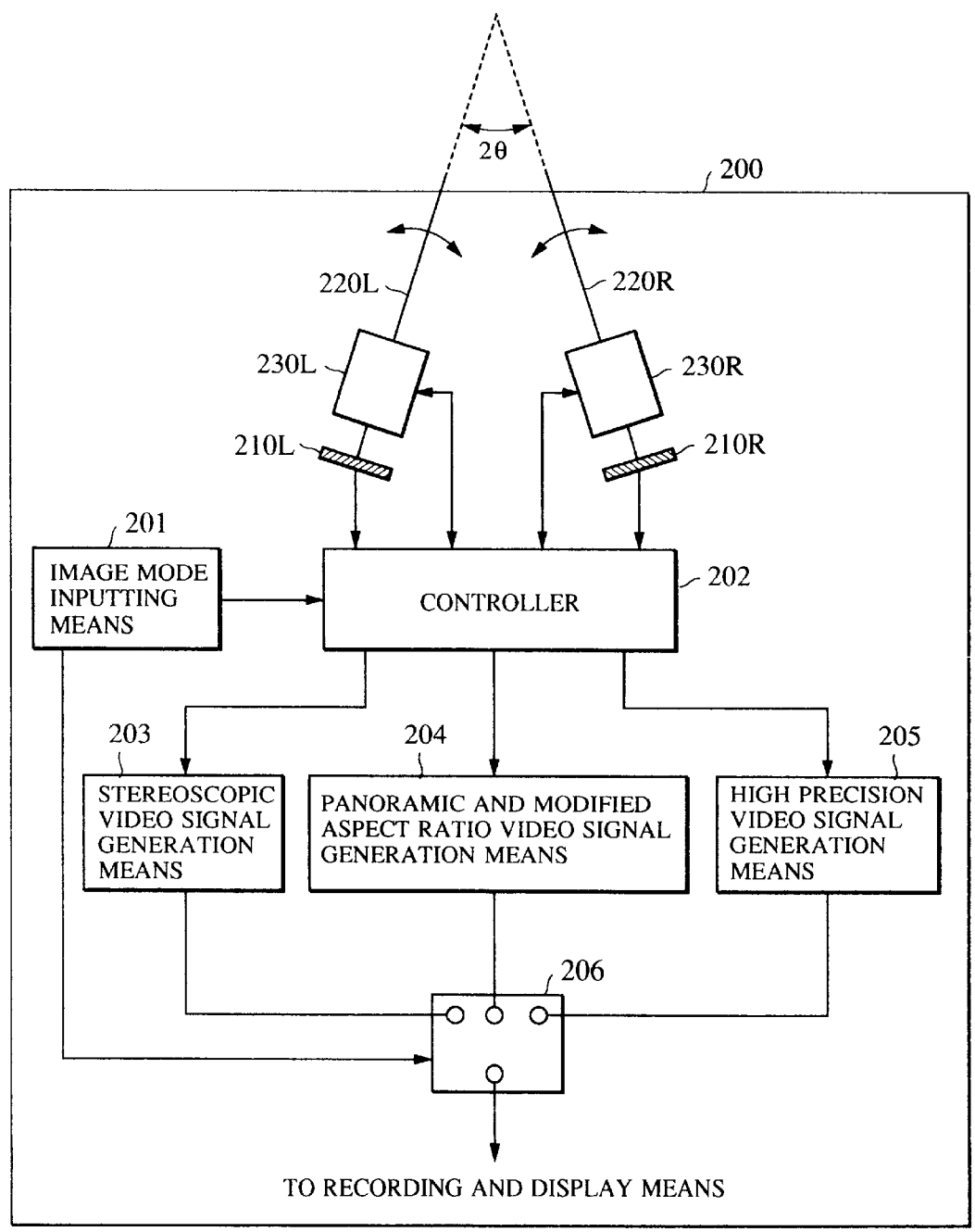
FIG. 4 is a block diagram illustrating the general configuration of a multifunction input device (200) shown in FIG. 1.

Referring to FIG. 4, the basic configuration of the multifunction input device 200 is described below. FIG. 4 is a block diagram illustrating the general configuration of the multifunction input device 200. In this figure, reference numerals 230L and 230R denote left and right imaging optical systems comprising, for example, a zoom lens. Reference numerals 210L and 210R denote left and right image sensors comprising a solid-state image sensor or an image pickup tube. Reference numeral 202 denotes a controller responsible for controlling the entire input system. The controller 202 adjusts the characteristics of the imaging optical systems 230L and 230R in such a manner as to minimize the difference in characteristics, such as magnification, between these two imaging optical systems. The controller 202 also adjusts the convergence angle 2Θ by controlling the right and left optical axes 220L and 220R via a driving system (not shown).

Reference numeral 201 denotes image mode inputting means used to designate an image mode such as a stereoscopic image mode, a panoramic image mode, or a high definition image mode. A signal indicating the designated image mode is input to the controller 202 and switching means 206. The controller 202 performs required adjustment such as the adjustment of the convergence angle 2θ of the imaging optical systems 230L and 230R depending on the designated image mode, and supplies video signals received via the right and left image sensors 210R and 210L to the stereoscopic video signal generation means 203, the panoramic and modified aspect ratio video signal generation means 204, and the high definition video signal generation means 205. The image generation means 203, 204, and 205 process the received video signal, and supply the resultant signal to video signal switching means 206.

The video signal switching means 206 selects a video signal from those provided by the signal generation means 203, 204, and 205 corresponding to the image mode designated via the image mode inputting means 201, and supplies the selected video signal to the recording and reproducing apparatus 100. The above-described basic configuration of the multifunction input device 200 is only one of possible examples, and the invention is not limited to such a configuration.

Referring to FIGS. 5(a)–(d), the video signals processed and generated by the stereoscopic video signal generation means 203, the panoramic and modified aspect ratio video signal generation means 204, and the high definition video signal generation means 205 are discussed below.

First, the operation of the stereoscopic video signal generation means 203 is described referring to FIGS. 5(a)–(d).

FIG. 5a illustrates a video signal obtained by the right imaging optical system 230R, wherein the video signal includes signals of a first field R1, a second field R2, . . . and so on. FIG. 5b illustrates a video signal obtained by the left imaging optical system 230L, wherein the video signal includes signals of a first field L1, a second field L2, . . . and so on.

In general, a stereoscopic image is generated in such a manner that a plurality of (left and right) imaging systems separately acquire or pick up images of the same object, and each image is projected onto the image sensor of each imaging system, wherein there is parallax between the images of the object obtained by the left and right imaging systems. The image obtained by the right imaging system is displayed in such a manner that the image can be viewed only by the right eye of an observer, and the image obtained by the left imaging system is displayed in such a manner that the image can be viewed only by the left eye of the observer, so that the observer can view a stereoscopic image.

The stereoscopic video signal generation means 203 combines the video signals given by the left and right imaging optical systems 230L and 230R into one video signal in such a manner that left and right field signals appear alternately in such an order, R1, L2, R3, L4, . . . and so on. Alternatively, the left and right video signals are recorded in parallel on separate recording tracks as shown in FIG. 5d.

Figure 6:
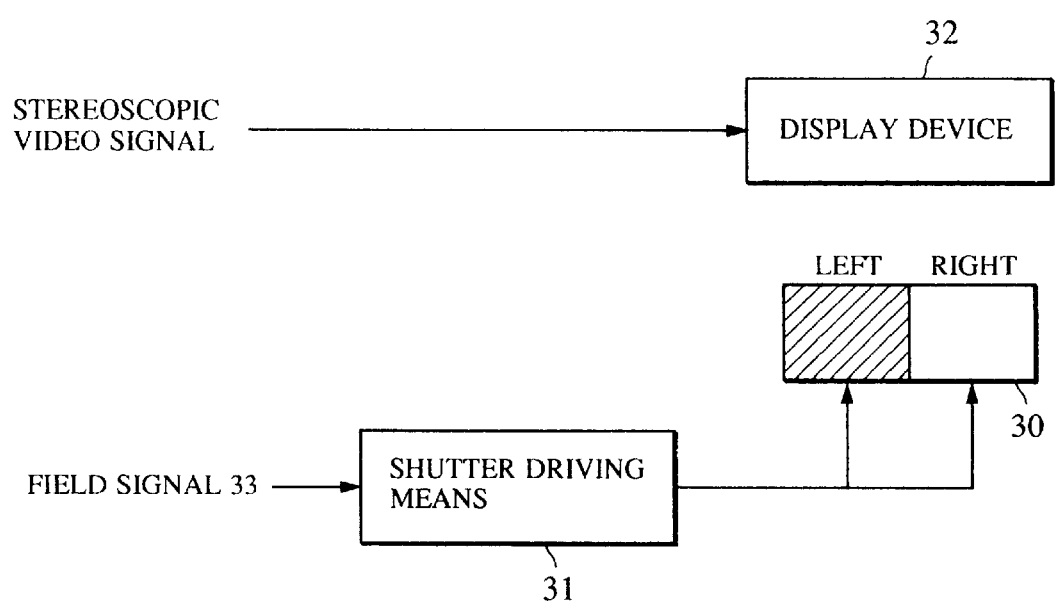
FIG. 6 is a block diagram illustrating the general configuration of an example of an output device (300) including a liquid crystal shutter.

When a video signal recorded in the format shown in FIG. 5c is reproduced, the video signal is input to a display device 32 such as shown in FIG. 6, and the field signal 33 is input to the shutter driving means 31 so that left and right images are switched by a liquid crystal shutter 30 which is driven by the driving means 31 in response to the field signal 33. When the video signal of fields R1, R3, R5, . . . shown in FIG. 5c are displayed on the display device 32, the left side of the liquid crystal shutter 30 is closed, and the right side is opened. On the other hand, when the video signal of fields L2, L4, L6, . . . shown in FIG. 5c are displayed on the display device 32, the left side of the liquid crystal shutter 30 is opened, and the right side is closed. As a result, an observer can view the image obtained by the right imaging system 230R only via his/her right eye, and the image obtained by the left imaging system 230L only via his/her left eye, and thus he/she can view a stereoscopic image.

Figure 7:
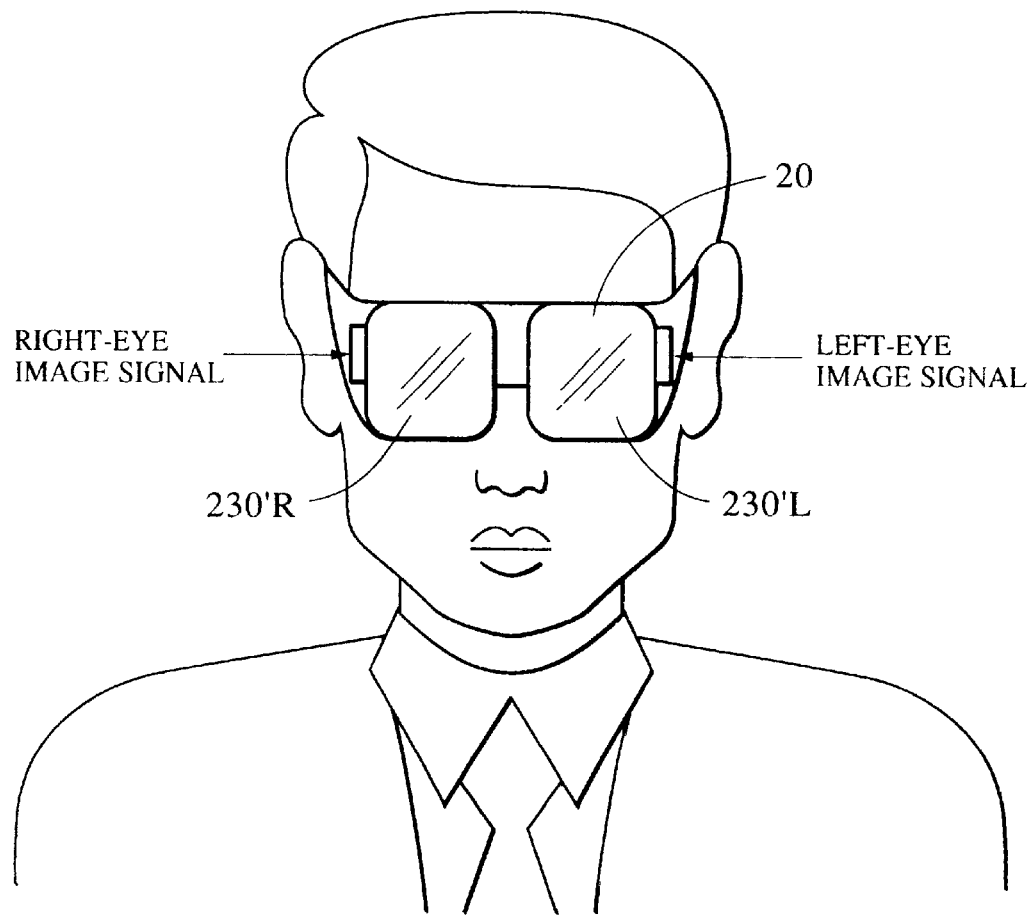
FIG. 7 is a schematic representation of an HMD attached to a user.

A stereoscopic image can also be observed via an HMD 20 such as shown in FIG. 7. In this case, video signals obtained by the left and right imaging systems 230L and 230R are displayed separately on left and right display units 230'L and 230'R. For this purpose, the video signals obtained via the imaging optical systems 230L and 230R are recorded in parallel as shown in FIG. 5d, and these video signals are reproduced in parallel during a reproducing operation so as to provide a stereoscopic image. In this way, the stereoscopic video signal generation means 203 converts an input video signal into a stereoscopic video signal.

Figure 8A:
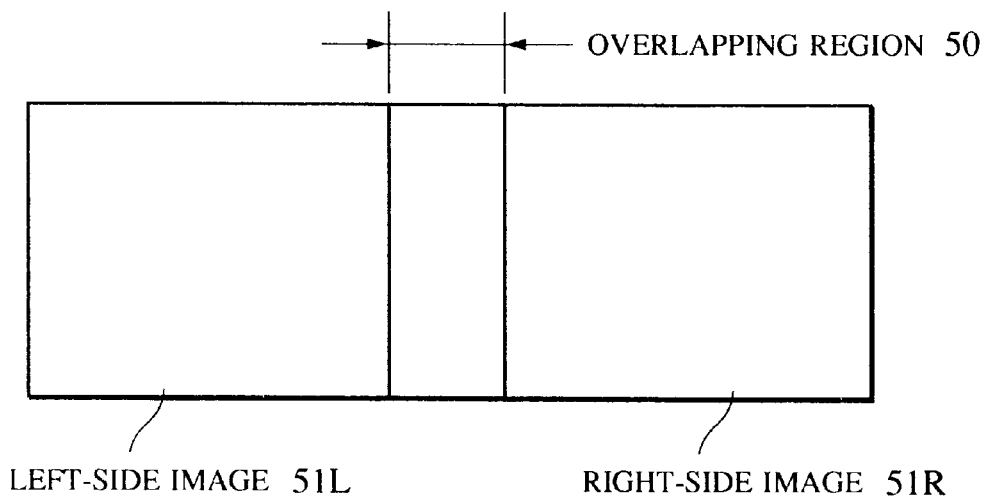
FIGS. 8(a) and (b) are schematic representations of an output image provided through modified aspect ratio video signal generation means (204) shown in FIG. 4.
Figure 8B:
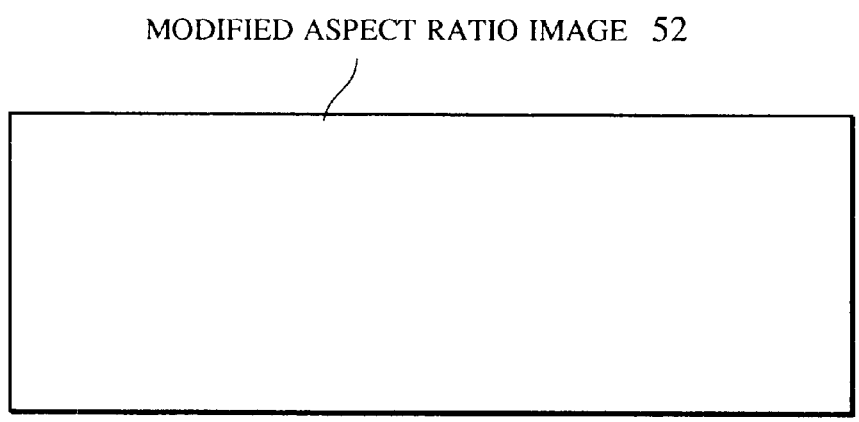

The panoramic and modified aspect ratio video signal generation means 204 controls the convergence angle 2θ via a driving system (not shown) in such a manner as to adjust the width of the overlapping region 50 shown in FIG. 8a, thereby synthesizing an image 52 having an arbitrary desired aspect ratio, such as that shown in FIG. 8b, from the right-side image 51R obtained via the right imaging optical system 230R and the left-side image 51L obtained via the left imaging optical system 230L.

Figure 9:
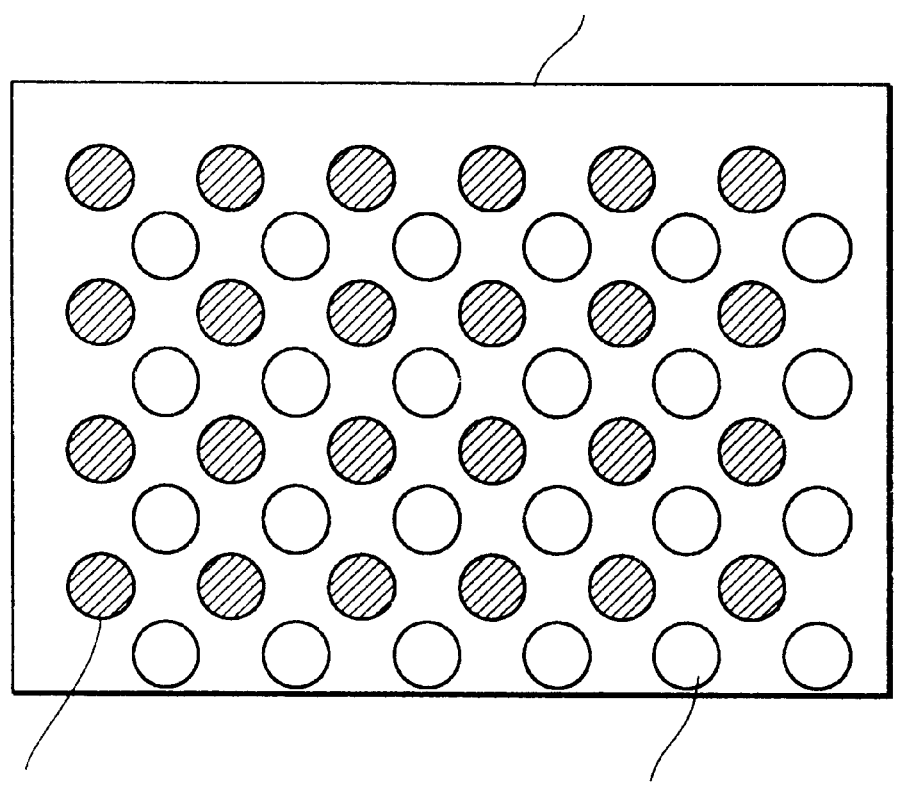
FIG. 9 is a schematic representation of a high definition image generated by high definition video signal generation means (205) shown in FIG. 4.

In the high definition image mode, the image of the same object is acquired by both left and right imaging optical systems 230L and 230R. The output signals of the left and right image sensors 210L and 210R are sampled by the high definition video signal generation means 205 with different timing, so that there is a phase difference between the videos signals obtained by these image sensors of an amount corresponding to a half pixel pitch in both horizontal and vertical directions. The high definition video signal generation means 205 combines the left image sampling points and the right image sampling points into one image in such a manner as shown in FIG. 9, thereby generating a high definition image 40 having a resolution equivalent to that obtained by an image sensor having twice as many pixels as the image sensor 210L or 210R.

Figure 10:
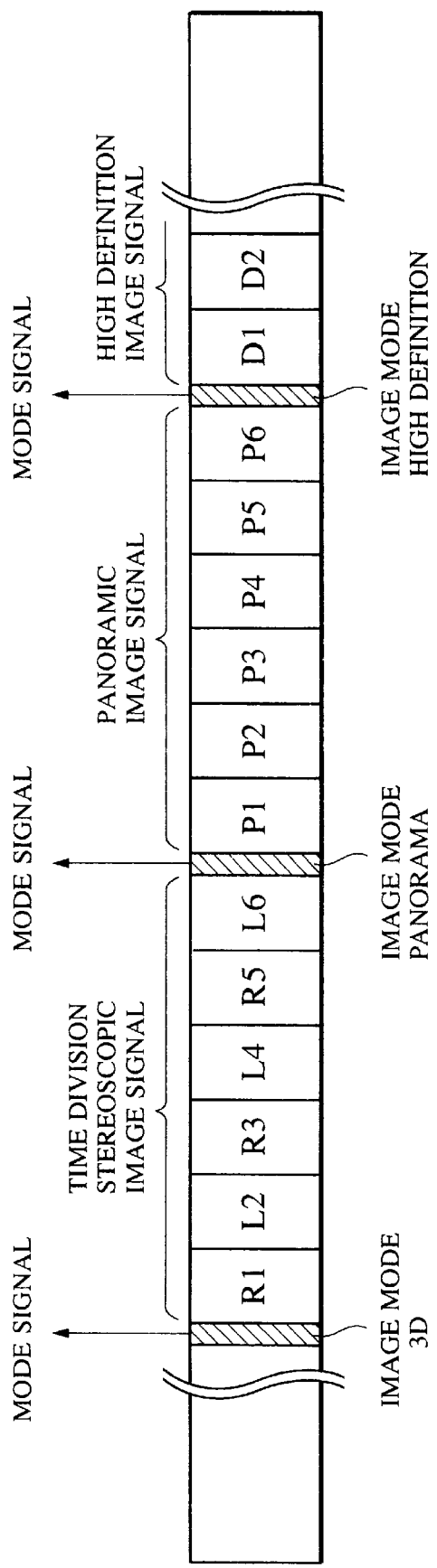
FIG. 10 is a schematic representation of an example of a signal recorded by the image recording and reproducing apparatus according to the first embodiment of the present invention.

Referring to FIG. 10, a specific example of an operation of recording and reproducing video signals generated by the multifunction input device 200 is described below.

FIG. 10 illustrates a signal recorded on a recording medium 103 of the recording and reproducing apparatus 100 for the case where the multifunction input device 200 acquires images while switching the image mode in the order of a stereoscopic image mode—a panoramic image mode—a high definition image mode.

The recording signal generation means 101 of the recording and reproducing apparatus 100 acquires a video signal generated by one of video signal generation means 203, 204, 205 corresponding to the image mode designated by the image mode inputting means 201 of the multifunction input device 200 and also acquires a signal indicating the designated image mode. The recording signal generation means 101 generates a recording signal in accordance with the above-described signals. As shown in FIG. 10, the recording signal of each image mode consists of a header portion located at the beginning and a video signal portion following the header portion, wherein the header portion contains a mode signal indicating the image mode associated with the video signal following it. In the example shown in FIG. 10, the recording signal simply contains video signals and associated mode signals. However, the recording signal may also contain information about the aspect ratio of the video signal or information about the amount of one field data. Furthermore, in the example shown in FIG. 10, the stereoscopic image signal is recorded in the form of a time division stereoscopic image signal such as that shown in FIG. 5c.

During a reproducing operation, the signal reading means 104 reads a signal such as that shown in FIG. 10 from the recording medium 103, and transfers the obtained signal to the image mode detecting means 105. The image mode detecting means 105 examines the mode signal recorded in the header portion of the first signal, and detects that the first video signal is of the stereoscopic image mode, in this case. The image mode detecting means 105 then sends a stereoscopic image mode detection signal to the display mode input means 106. In response to the stereoscopic image mode detection signal, the display mode input means 106 displays a stereoscopic mode menu on the display panel 10 as shown in FIG. 3a. Thus, a user can know that the video signal is of the stereoscopic image mode. The user selects a proper display mode from the menu, and starts reproduction of the video signal. In the example shown in FIG. 3a, the liquid crystal shutter mode is selected as the display mode which is indicated by the selection marker.

If the liquid crystal shutter mode is selected via the display mode inputting means 106, the display signal generation means 107 outputs a video signal to the display device 32 shown in FIG. 6, and also outputs a field signal 33 acting as a synchronizing signal to the shutter driving means 31.

In the case where the HMD mode is selected from the stereoscopic image mode menu shown in FIG. 3a, it is required to provide a full field video signal for both left and right signals as shown in FIG. 5d. To achieve the above requirement, the display signal generation means 107 generates a field image signal R2 by interpolating the field image signals R1 and R3 contained in the time division stereoscopic image signal shown in FIG. 10, and generates a field image signal L3 by interpolating the field image signals L2 and L4 contained in the time division stereoscopic image signal shown in FIG. 10. In this way, the display signal generation means 107 further generates required field image signals, and supplies the resultant video signal to the HMD 20 shown in FIG. 7. In the case where the stereoscopic image signal is recorded in the form such as that shown in FIG. 5d, the above-described interpolation is not required.

Figure 11A:
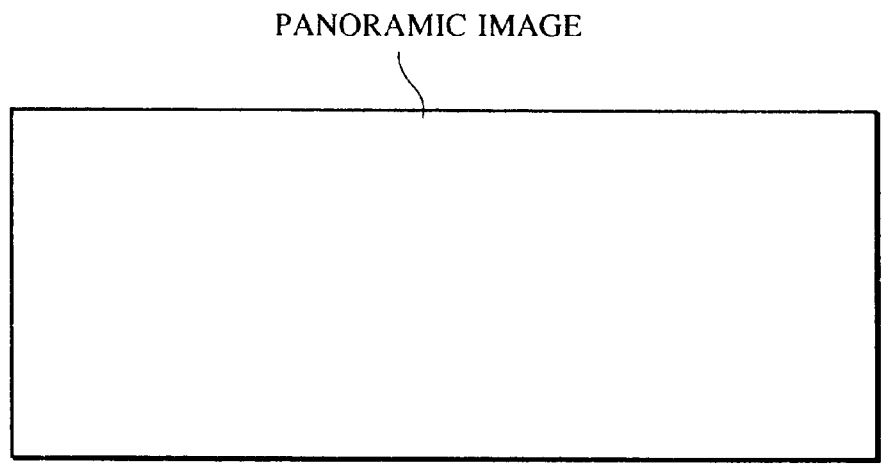
FIGS. 11(a) and (b) are schematic representations of a conversion process associated with a panoramic image.
Figure 11B:
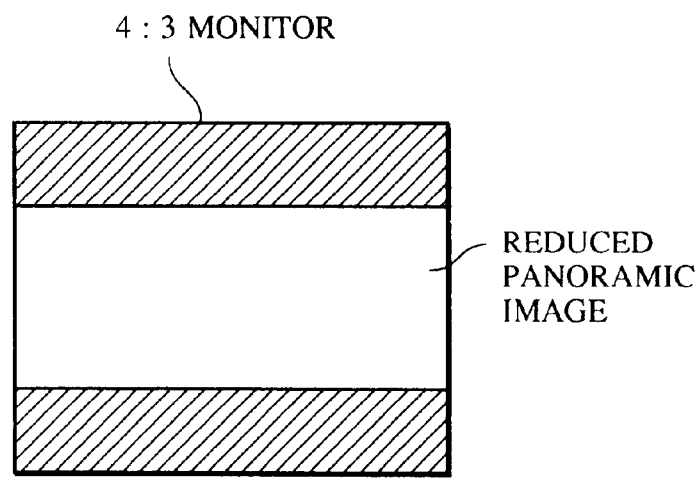

When the image mode detecting means 105 detects a mode signal indicating the panoramic image mode from the signal shown in FIG. 10, the image mode detecting means 105 sends a panoramic image mode detection signal to the display mode input means 106. Then, a panoramic image mode menu such as that shown in FIG. 3b is displayed on the display panel 10 so as to notify the user that the image mode has changed into a panoramic image mode. The user selects a proper display mode from this menu. If, for example, the 4:3-monitor mode is selected, the display signal generation means 107 reduces the panoramic image signal into a size corresponding to the monitor size as shown in FIG. 11, thereby generating a reduced panoramic video signal.

If the image mode detecting means 105 detects a signal indicating the high definition image mode from the signal shown in FIG. 10, the image mode detecting means 105 sends a high definition image mode detection signal to the display mode input means 106. A high definition image mode menu is displayed on the display panel 10, as shown in FIG. 3(c), and thus the user can know that the image mode has changed into a high definition image mode. The user selects a proper display mode from the menu. The display signal generation means 107 generates a video signal in a format that matches the selected display mode.

In the embodiment described above, an image mode signal is recorded at the header portion located at the beginning of a video signal in each image mode, as shown in FIG. 10. However, the invention is not limited to that. An image mode signal may also be recorded at a footer portion. Furthermore, an image mode signal may recorded for each field, or each frame.

In the recording and reproducing apparatus 100 according to the present embodiment, as described above, a signal indicating the image mode of a video signal in which the video signal is generated by the multifunction input device 200 is recorded together with the video signal, so that the recorded video signal can be reproduced in a proper mode corresponding to the image mode of the recorded video signal. Even in the case where various video signals in different image modes are recorded, the image mode of each video signal is displayed so that a user can know the change in the image mode, and thus the user can enjoy a video signal in any image mode by selecting a proper display corresponding to the image mode.

Figure 12:
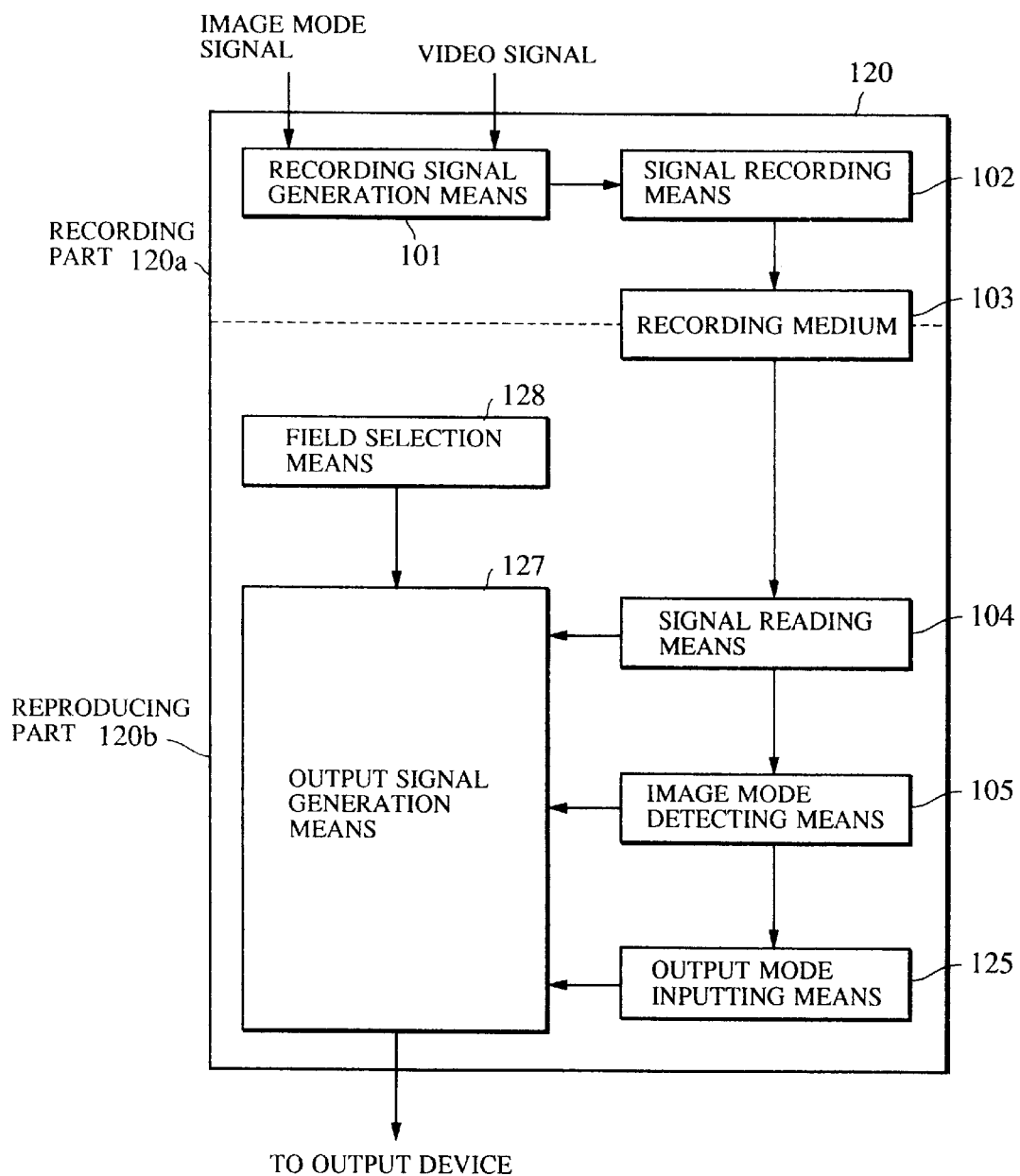
FIG. 12 is a block diagram illustrating the general configuration of an image recording and reproducing apparatus according to a second embodiment of the present invention.

Referring to FIG. 12, a second embodiment of the present invention is described below. FIG. 12 is a block diagram illustrating the general configuration of a recording and reproducing apparatus 120 according to the second embodiment of the present invention. In FIG. 12, elements that operate in the same manner as those in FIG. 2 are denoted by the same reference numerals as those in FIG. 2, and these elements will not be described here again. Instead of the display mode input means 106 of the recording and reproducing apparatus 100 shown in FIG. 2, output mode inputting means 125 is provided in the recording and reproducing apparatus 120. Furthermore, instead of the display signal generation means 107, there is provided output signal generation means 127 connected to field selection means 128, which is also an addition to the recording and reproducing apparatus 120 with respect to the recording and reproducing apparatus 100.

The recording and reproducing apparatus 120 can operate when coupled with a printer, a film printing apparatus, or similar devices acting as an output device for outputting a reproduced signal. When the output mode inputting means 125 receives an image mode detection signal from the image mode detecting means 105, a corresponding menu is displayed on the display panel as in the first embodiment. A user selects an appropriate output device from the menu. Then, a signal indicating the output mode selected via the output mode inputting means 125 is sent to the output signal generation means 127.

In accordance with the image mode detection signal as well as the signal indicating the output mode, the output signal generation means 127 converts an arbitrary field of video signal, selected via the field selection means 128 from a video signal supplied by the signal reading means 104, into a format that matches the selected output mode.

Figure 13:
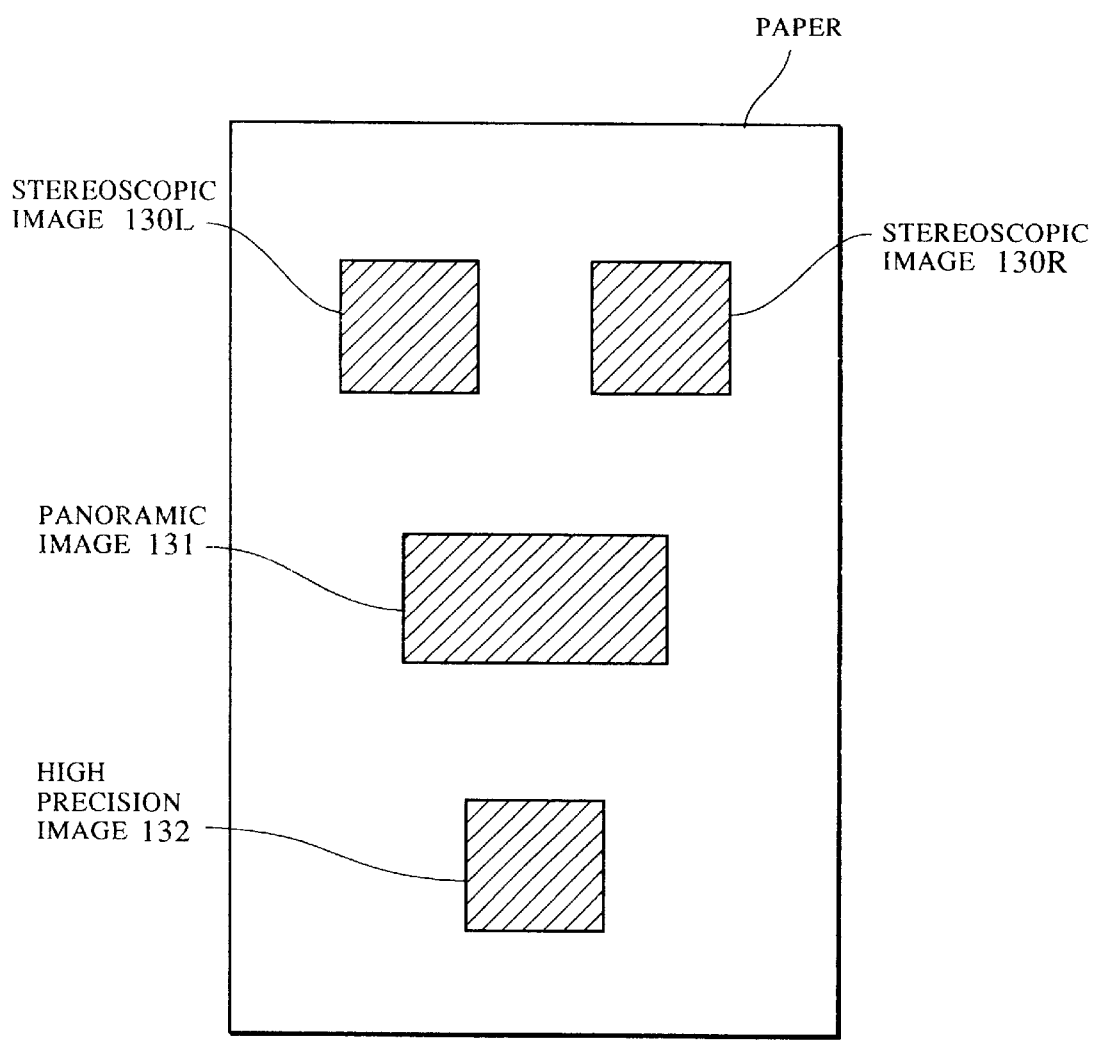
FIG. 13 is a schematic representation of an example of an image processed by the apparatus shown in FIG. 12 and printed on a piece of paper.

FIG. 13 illustrates an example of an output video signal that has been processed by the recording and reproducing apparatus 120. In this example, stereoscopic images 130L and 130R, a panoramic image 131, and a high definition image 132 are printed on a piece of paper.

Figure 14:
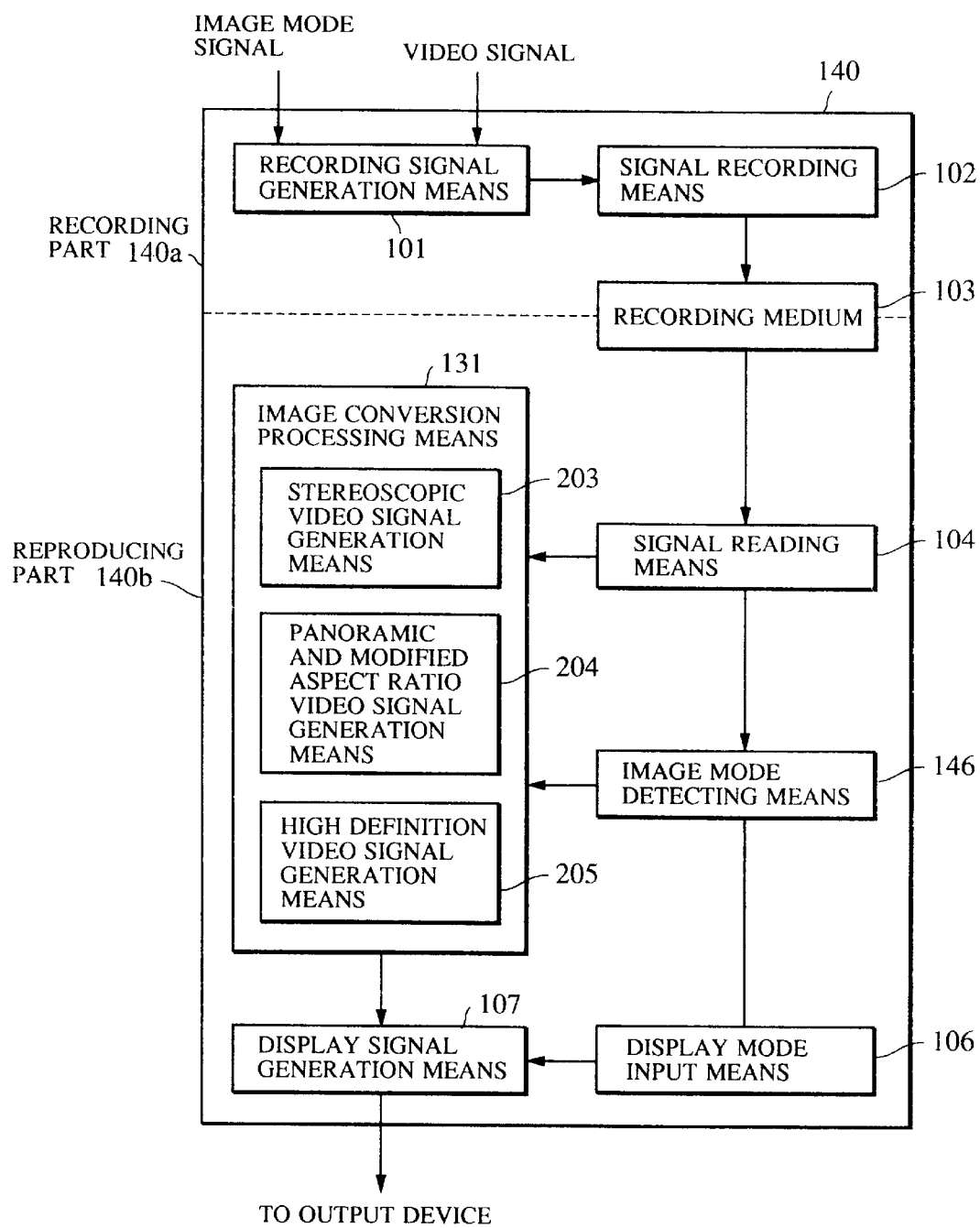
FIG. 14 is a block diagram illustrating the general configuration of an image recording and reproducing apparatus according to a third embodiment of the present invention.

Now, a third embodiment of the present invention is described referring to FIG. 14. FIG. 14 is a block diagram illustrating the general configuration of a recording and reproducing apparatus 140 according to the third embodiment of the invention. In FIG. 14, elements that operate in the same manner as those in FIG. 2 are denoted by the same reference numerals as those in FIG. 2, and these elements will not be described here again.

The recording and reproducing apparatus 140 according to the present embodiment is a combination of a recording and reproducing apparatus 100 shown in FIG. 2 and image conversion processing means 131 including stereoscopic video signal generation means 203, panoramic and modified aspect ratio video signa generation means 204, and high definition video signal generation means 205, wherein those signal generation means are similar to those used in the multifunction input device 200 shown in FIG. 4. In the recording and reproducing apparatus 140 configured in this manner, any type of input device can be used with the recording and reproducing apparatus, as long as the input device has the capability of outputting a video signal acquired via a plurality of imaging optical systems. The recording and reproducing apparatus 140 receives a video signal from an input device of such a type and records the received video signal together with a mode signal indicating the image mode in which the video signal has been acquired, in such a format as shown in FIG. 5c.

The recording and reproducing apparatus 140 also has the capability of selecting a video signal mode during a reproducing operation via the image conversion processing means 131. That is, a signal recorded on a recording medium 103 is read by the signal reading means 104 and supplied to the image mode detecting means 146. The image mode detection signal indicating the image mode detected by the image mode detecting means 146 is then supplied to the display mode input means 106. In response to the image mode detection signal, the display mode input means 106 displays a corresponding image mode on the display panel. A user judges whether the displayed image mode correctly corresponds to an output device to be used. If not, the user designates a correct mode via the image mode detecting means 146. The image mode detecting means 146 then notifies the image conversion processing means 131 of the designated image mode.

In accordance with the mode designated by the image mode detecting means 146, the image conversion processing means 131 transfers the received video signal to one of the stereoscopic video signal generation means 203, the panoramic and modified aspect ratio video signal generation means 204, and the high definition video signal generation means 205, thereby generating a video signal. The generated video signal together with a control signal added to the video signal depending on the display mode is output to the display device.

In the recording and reproducing apparatus 140 according to the present embodiment, as described above, the mode of an input video signal can be converted to another mode by the image conversion processing means 131. Thus, a user can observe an image reproduced in various forms corresponding to a display device used.

In the above-described embodiment, the image conversion processing means 131 includes the stereoscopic video signal generation means 203, the panoramic and modified aspect ratio video signal generation means 204, and the high definition video signal generation means 205. However, the present invention is not limited to such a configuration. The image conversion processing means 131 may also include another video signal generation means to generate a video signal in an arbitrary format. As a matter of course, each video signal generation means described above may be replaced with another type of signal generation means.

Furthermore, the functions of elements used in each embodiment described above may also be implemented by means of software.

In the image recording and reproducing apparatus according to the present invention, as described above, when video signals at least in two different modes are input to the recording processing means, a signal indicating the mode of each video signal is added to the corresponding video signals. During a reproducing operation, the signal reading means reads the recorded signal. The detecting means detects the mode of the video signal. The generation means generates a signal in a format that matches the detected mode of the video signal and also matches the type of output device input via an input means. Thus, it is possible to record video signals in various modes acquired via an image pickup apparatus having a plurality of imaging optical systems. During a reproducing operation, it is possible to obtain an output signal in a format that matches the recorded video signal and also matches the type of output device used.

The individual components shown in outline or designated by blocks in the drawings are all well-known in the image recording and reproducing arts, and their specific construction and operation are not critical to the operation of best mode for carrying out the present invention.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of those claims is to be accorded the broadest interpretation so as to encompass all such modifications and equivalent structures and functions.

What is claimed is:

1. An image pickup apparatus, comprising:
a pair of image pickup means for picking up respective images;
image pickup mode control means for controlling said pair of image pickup means, said pair of image pickup means having at least the following modes:
a mode in which a stereoscopic image is picked up by said pair of image pickup means; and
a mode in which a panoramic image is picked up by said pair of image pickup means;

a mode in which a modified aspect ratio image is picked up by said pair of image pickup means;

a mode in which an HDTV image is picked up by said pair of image pickup means;

selection means for selecting one of the modes associated with said image pickup mode control means;

change means for changing a relative angle between optical axes of said pair of image pickup means according to the mode selected by said selection means; and recording means for recording a mode signal of said selection means together with an image signal picked up in the selected mode.

2. An image pickup apparatus according to claim 1, further including reproducing means for reproducing the signals recorded by said recording means.

3. An image pickup apparatus according to claim 2, further including reproducing mode switching means for switching the reproducing mode depending on the output signal of said reproducing means.

4. A method of processing an image, said method comprising the steps of:

selecting an image pickup mode from: a mode in which a stereoscopic image is picked up; a mode in which a panoramic image is picked up, a mode in which a modified aspect ratio image is picked up; and a mode in which an HDTV image is picked up;

controlling a pair of image pickup units to operate in accordance with the selected image pickup mode to produce an image signal;

changing a relative angle between optical axes of said pair of image pickup units according to the mode selected by said selecting step; and recording on a recording medium a mode signal indicating the selected image pickup mode together with the image signal.

5. A method according to claim 4, further comprising the step of reproducing the recorded signals.

6. A method according to claim 5, further comprising the step of processing the reproduced image signal in accordance with the reproduced mode signal and outputting the processed signal to an output device.

7. A method according to claim 6, wherein said processing step further comprises processing the reproduced image signal in accordance with the type of output device to which the processed signal will be output.

* * * * *